(12) United States Patent
Kosbab et al.

(10) Patent No.: US 11,601,406 B2
(45) Date of Patent: Mar. 7, 2023

(54) DECRYPTING SYNTHETIC TRANSACTIONS WITH BEACON PACKETS

(71) Applicant: NetScout Systems, Inc., Westford, MA (US)

(72) Inventors: Bruce Kosbab, Colorado Springs, CO (US); Bob Vogt, Colorado Springs, CO (US); Paul Alexander Barrett, Westford, MA (US); Anil K. Singhal, Carlisle, MA (US); Ashwani Singhal, Andover, MA (US); Narendra Byrapuram, Westford, MA (US)

(73) Assignee: NetScout Systems, Inc., Westford, MA (US)

( * ) Notice: Subject to any disclaimer, the term of this patent is extended or adjusted under 35 U.S.C. 154(b) by 225 days.

(21) Appl. No.: 16/997,370

(22) Filed: Aug. 19, 2020

(65) Prior Publication Data

US 2022/0060452 A1 Feb. 24, 2022

(51) Int. Cl.
*H04L 9/00* (2022.01)
*H04L 9/40* (2022.01)
*H04L 9/08* (2006.01)
*H04L 43/10* (2022.01)
*H04L 69/22* (2022.01)

(52) U.S. Cl.
CPC ........ *H04L 63/0428* (2013.01); *H04L 9/0819* (2013.01); *H04L 9/0894* (2013.01); *H04L 43/10* (2013.01); *H04L 63/126* (2013.01); *H04L 63/166* (2013.01); *H04L 69/22* (2013.01)

(58) Field of Classification Search
None
See application file for complete search history.

(56) References Cited

U.S. PATENT DOCUMENTS

| | | | |
|---|---|---|---|
| 2008/0043686 A1* | 2/2008 | Sperti | H04L 63/1408 370/338 |
| 2017/0164223 A1* | 6/2017 | Guo | H04L 43/08 |
| 2019/0182129 A1 | 6/2019 | Canady et al. | |
| 2020/0064487 A1* | 2/2020 | Krzych | H04B 17/318 |
| 2020/0252411 A1 | 8/2020 | Inforzato et al. | |

FOREIGN PATENT DOCUMENTS

EP 2 398 188 A1 12/2011

\* cited by examiner

*Primary Examiner* — Brandon Hoffman
(74) *Attorney, Agent, or Firm* — Foley & Lardner LLP

(57) ABSTRACT

Decrypting synthetic transactions with beacon packets is provided. A probe receives, from a client device, a start beacon packet that identifies a test of a service provided by one or more servers. The probe establishes, responsive to receipt of the start beacon packet, a log for the test. The probe stores, in the log established responsive to the start beacon packet, data packets transmitted between the client device and the one or more servers subsequent to the start beacon packet and encrypted with a key using a security protocol. The probe receives, from the client device, key information used to decrypt the data packets of the test encrypted with the key using the security protocol. The probe provides at least one of the data packets for evaluation or decryption using the key information to determine a performance of the service.

20 Claims, 8 Drawing Sheets

DECRYPTING SYNTHETIC TRANSACTIONS WITH BEACON PACKETS

BACKGROUND

Digital services can be provided by servers to client devices over a network, such as the Internet. For example, servers can provide access to web sites, applications, content, or other digital services. Providers of the digital services can periodically test the digital services and content to evaluate the performance of the digital services, or identify issues associated with providing the digital services. However, due to the various security protocols used by client devices and services to communicate over a network, it can be challenging to analyze encrypted data packets to evaluate the test of the digital service.

SUMMARY

Systems and methods of the present technical solution are directed to conducting synthetic transactions with beacon packets, as well as decrypting synthetic transactions that are encrypted using a secure protocol. A client device (e.g., a synthetic transaction generator) can initiate a synthetic transaction to test the performance of a digital service, such as an application, provided by a server. The client device can transmit a start beacon indicating the initiation of the test. The start beacon can include information such as a source internet protocol ("IP") address and an identifier of the type of test. A passive network probe (e.g., a probe component) can detect the start beacon and determine to establish an entry in a log to record data packets corresponding to the synthetic transaction. The client device and server can perform a handshaking process to establish an encrypted communication session. For example, the client device and server can establish, via the handshake process, a key for the communication session using a transport layer security protocol. The client device can transmit a data packet with the key information to the probe component so that the probe component can decrypt the encrypted data packets to view the contents of the data packets of the synthetic transaction. The probe component can decrypt data packets in real-time using the key information, or can decrypt the data packets after completion of the test. The client device can transmit the key information to the probe component after the handshaking process is complete, or the client device can transmit the key information at the end of the test along with a stop beacon indicating completion of the test. For example, if multiple keys are established due to multiple handshaking processes, the client device can either transmit the new key information subsequent to each handshaking process, or the client device can store the multiple keys and transmit the multiple keys along with the stop beacon at the end of the test. Thus, by providing key material for encrypted synthetic transactions, systems and methods of this technical solution can debug or evaluate the performance of an application or digital service provided by a server to a client device via an encrypted communication session.

At least one aspect is directed to a method of conducting a synthetic transaction with beacon packets. The method can be performed by a probe having one or more processors. The method can include the probe receiving, from a client device, a start beacon packet that identifies a test of a service provided by one or more servers. The method can include the probe establishing, responsive to receipt of the start beacon packet, a log for the test. The method can include the probe identifying, responsive to the start beacon packet, a plurality of data packets corresponding to the test transmitted between the client device and the one or more servers subsequent to the start beacon packet. The data packets can refer to or be included in beacon frames. The method can include the probe storing, in the log established for the test, at least one of the plurality of data packets for evaluation to determine a performance of the service. In some implementations, the probe can convert the data packets from a first protocol or format (e.g., secure protocol) into a second protocol or format (e.g., unencrypted) that is different from the first protocol or format.

At least one aspect is directed to a system to conduct a synthetic transaction with beacon packets. The system can include a probe having one or more processors. The probe can receive, from a client device, a start beacon packet that identifies a test of a service provided by one or more servers. The probe can establish, responsive to receipt of the start beacon packet, a log for the test. The probe can identify, responsive to the start beacon packet, a plurality of data packets corresponding to the test transmitted between the client device and the one or more servers subsequent to the start beacon packet. The data packets can refer to or be included in beacon frames. The probe can store, in the log established for the test, at least one of the plurality of data packets for evaluation to determine a performance of the service. In some implementations, the probe can convert the data packets from a first protocol or format (e.g., secure protocol) into a second protocol or format (e.g., unencrypted) that is different from the first protocol or format.

At least one aspect of this technical solution is directed to a method of decrypting synthetic transactions with beacon packets. The method can be performed by a probe having one or more processors. The method can include the probe receiving, from a client device, a start beacon packet that identifies a test of a service provided by one or more servers. The method can include the probe establishing, responsive to receipt of the start beacon packet, a log for the test. The method can include the probe identifying, responsive to the start beacon packet, a plurality of data packets. The plurality of data packets can correspond to the test and be transmitted between the client device and the one or more servers subsequent to the start beacon packet. The plurality of data packets can be encrypted with a key using a security protocol. The method can include the probe receiving, from the client device, key information used to decrypt the plurality of data packets of the test encrypted with the key using the security protocol. The method can include the probe storing, in the log established for the test, at least one of the plurality of data packets for evaluation or decryption using the key information to determine a performance of the service.

At least one aspect of this technical solution is directed to a system to decrypt synthetic transactions with beacon packets. The system can include a probe component. The probe component can receive, from a client device, a start beacon packet that identifies a test of a service provided by one or more servers. The probe component can establish, responsive to receipt of the start beacon packet, a log for the test. The probe component can identify, responsive to the start beacon packet, a plurality of data packets. The plurality of data packets can correspond to the test and be transmitted between the client device and the one or more servers subsequent to the start beacon packet. The plurality of data packets can be encrypted with a key using a security protocol. The probe component can receive, from the client device, key information used to decrypt the plurality of data packets of the test encrypted with the key using the security protocol. The probe component can store, in the log established for the test, at least one of the plurality of data packets for evaluation or decryption using the key information to determine a performance of the service.

At least one aspect of this technical solution is directed to a non-transitory computer-readable medium storing instructions that, when executed by one or more processors, cause the one or more processors to decrypt synthetic transactions. The instructions can include instructions to receive, from a client device, a start beacon packet that identifies a test of a service provided by one or more servers. The instructions can include instructions to establish, responsive to receipt of the start beacon packet, a log for the test. The instructions can include instructions to identify, responsive to the start beacon packet, a plurality of data packets. The plurality of data packets can correspond to the test and be transmitted between the client device and the one or more servers subsequent to the start beacon packet. The plurality of data packets can be encrypted with a key using a security protocol. The instructions can include instructions to receive, from the client device, key information used to decrypt the plurality of data packets of the test encrypted with the key using the security protocol. The instructions can include instructions to store, in the log established for the test, at least one of the plurality of data packets for evaluation or decryption using the key information to determine a performance of the service.

These and other aspects and implementations are discussed in detail below. The foregoing information and the following detailed description include illustrative examples of various aspects and implementations and provide an overview or framework for understanding the nature and character of the claimed aspects and implementations. The drawings provide illustration and a further understanding of the various aspects and implementations and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
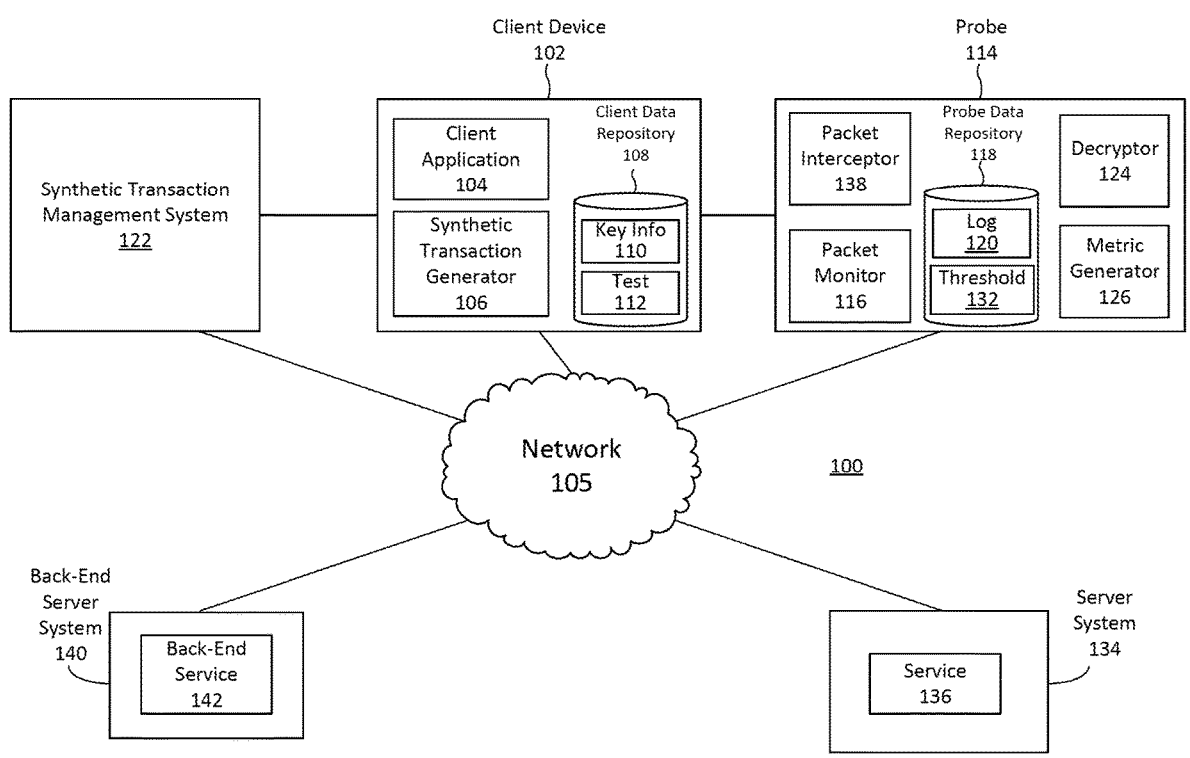
FIG. 1 is an illustration of a system to decrypt synthetic transactions, in accordance with an implementation.

Following below are more detailed descriptions of various concepts related to, and implementations of, methods, apparatus, and systems of conducting synthetic transactions with beacon packets, or decrypting synthetic transactions with beacon packets. For example, the methods, apparatus, and systems can log data packets associated with synthetic transactions, and process the data packets to evaluate a performance of the synthetic transaction. The methods, apparatus, and systems can log data packets associated with synthetic transactions that are encrypted with transport layer security and receive a key beacon packet with key material that can be used to decrypt the encrypted data packets of the synthetic transactions. The various concepts introduced above and discussed in greater detail below may be implemented in any of numerous ways.

Organizations can provide digital services, such as a website or application, over a network. To test the availability or performance of the digital service, the organization can execute synthetic transactions. A synthetic transaction can refer to simulating activities performed by an application or client device accessing the digital service. The synthetic transaction can be performed at any time and can facilitate evaluating the availability and performance of a digital service at times when human users may be less active or not active. For example, if a business service becomes unavailable over the weekend, users of that service may not find out until Monday morning. However, by using synthetic transactions to test the availability and performance of a service at regular intervals (e.g., every hour) the operator can be alerted to any problems shortly after they occur and can take remedial action. By regularly performing the same types of synthetic transactions, a system of this technical solution can establish a baseline for normal behavior of a digital service. Upon detecting a deviation from the established baseline, the system can generate an alert notifying the operator of the digital service of a performance or availability issue.

For example, the digital service can include a collaboration service web site. A synthetic transaction generator can be a standalone device or component. In some cases, a client device can execute or include a synthetic transaction generator. The synthetic transaction generator can be deployed at a location where human users make similar transactions, for example at a branch office, regional office or campus. In some cases, the synthetic transaction generator can be located at a separate site, such as an availability zone managed by a public cloud provider. In either case, the probe can be deployed between the transaction generator and the interconnection with the public Internet or wide area network (WAN). An illustrative synthetic business transaction test on the collaboration service web site can include the following sequence of individual tests: 1) log into the web site homepage; 2) join a meeting; 3) wait in the meeting; 4) leave the meeting; and 5) log out. The system can detect a problem with one or more of these tests. To debug or better understand the problem in order to resolve the problem, an operator of the digital service can view the contents of the data packets that were sent between the client device and the web server providing the digital service. Viewing the contents allows for detailed troubleshooting, including inspecting the different hypertext transfer protocol ("HTTP") headers generated by both the client device and the server, the HTTP response codes generated for different subcomponents of an HTTP page, or code such as Javascript.

To obtain the data packets transmitted between the client device (e.g., synthetic transaction generator) and the server, the system can include a passive packet monitoring probe. The passive monitoring probe can be referred to herein as a probe, probe device, or probe component. The probe can be a standalone device or software component executed by a client device or server. The probe can be located anywhere on the network between the synthetic transaction generator and the server such that the probe can obtain the data packets corresponding to the synthetic transactions. For example, the probe can be located at the same location as the client device, or in the data center hosting the application servers. The probe can be used to store the data packets for subsequent inspection. In some cases, the passive monitoring probe can also generate and baseline metrics such as the response time of each type of test.

However, client applications (e.g., web browsers) can access digital services provided by servers (e.g., a web server) using a secure network protocol. While it may be possible to perform the test using unencrypted HTTP, may not be representative of a transaction generated by a human user that utilizes encrypted HTTP, and web sites may no longer allow plaintext HTTP transactions. Thus, this technical solution can use a secure network protocol to conduct the synthetic transaction test. The client application and server can use any type of secure network protocol, including, for example, a transport layer security ("TLS") protocol or a QUIC protocol. QUIC can refer to a general-purpose transport layer network protocol and can be used for connection-oriented web applications that use transmission control protocol ("TCP"). For example, web browsers can access digital services provided by web servers using the hypertext transfer protocol secure ("HTTPS"). HTTPS can use the QUIC protocol, TLS protocol or other security protocol to encrypt the plaintext HTTP data. HTTPS can also be used by an application to exchange information with backend services. During the initial handshake phase of a secure session (e.g., TLS session or QUIC session), the client device and server use a key agreement algorithm to derive a set of key material that is known to both the client and server and that is unique to that secure session.

The key agreement mechanisms can prevent an eavesdropper from accessing the key material. Similarly, the probe may not have access to the key information, thereby preventing the probe from decrypting the data packets of the synthetic transaction and debugging the issue that may have led to an availability or performance issue associated with the digital service. While the probe can determine certain performance metrics without decrypting the packets (e.g., the response time of the test can be calculated as the time delay between first packet from the client to the last packet from the server), the probe cannot facilitate further troubleshooting by inspecting the contents of the packets the packets are encrypted using the key material established during the secure protocol handshake process.

Thus, systems and methods of the present technical solution can decrypt synthetic transactions with beacon packets. To do so, the client device generating the synthetic transactions can transmit the key material generated for the secure session during the handshake in one or more beacon packets to the probe. The client device can transmit the key material upon completion of the handshake, or at the end of the test in a stop beacon.

The probe can obtain the key material, decrypt the packets, and provide a graphical user interface to inspect the contents of the decrypted packets in the sequence. The probe can decrypt the data packets in real-time (e.g., during the test or prior to storing the data packets in the log), and store the data packets in the log established for the test subsequent to decryption. In some cases, the probe can perform post-test decryption, such as after completion of the test or responsive to a request to view the contents of the data packets. In this case, the probe can store the data packets in an encrypted form in the log, along with the key information. For example, the probe can detect a start beacon at the start of the sequence of data packets, and then locate packets at the end of the sequence containing the encryption key material. The probe can use the key material to decrypt the packets and display the plaintext HTTP.

This technical solution can provide for real-time or post-test metric generation and inspection of packets received at the probe. To do so, the probe can receive a beacon packet containing the key material for the secure session once the handshake is complete or once the key material becomes available prior to completion of the TLS handshake. The probe can use the received key material to decrypt the application packets as they arrive and generate metrics from the decrypted payload. The packets can be stored in either encrypted or unencrypted form since the beacon packet with the key material will be stored with them.

FIG. 1 illustrates an example system 100 to decrypt synthetic transactions with beacon packets. In brief overview, the system 100 can include a probe 114 that receives and stores data packets transmitted via a network 105 between a client device 102 and a server system 134 providing a service 136. The server system 134 can include one or more servers 302 depicted in FIG. 3A, or a data center 308. The system 100 can include a synthetic transaction management system 122 that can communicate or interface with synthetic transaction generator 106 or client device 102, either directly or via network 105, in order to establish or configure the synthetic test executed by the synthetic transaction generator 106. The probe 114 can generate metrics based on the packets, present the contents of the packets, or otherwise facilitate evaluating the availability or performance of the service 136 provided by the server system 134.

The client device 102, probe 114, synthetic transaction management system 122 or server system 134 can include or execute on one or more processors or computing devices (e.g., computing device 303 depicted in FIG. 3C) and communicate via network 105. The network 105 can include computer networks such as the Internet, local, wide, metro, or other area networks, intranets, satellite networks, and other communication networks such as voice or data mobile telephone networks. The network 105 can be used to access information resources such as web pages, web sites, domain names, or uniform resource locators that can be presented, output, rendered, or displayed on at least one computing device, such as a laptop, desktop, tablet, personal digital assistant, smart phone, portable computers, or speaker. For example, via the network 105 the client device 102 can access information or data provided by the service 136.

The network 105 may be any type or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. The network 105 may include a wireless link, such as an infrared channel or satellite band. The topology of the network 105 may include a bus, star, or ring network topology. The network may include mobile telephone networks using any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS") or universal mobile telecommunications system ("UMTS"). Different types of data may be transmitted via different protocols, or the same types of data may be transmitted via different protocols.

Each of the client device 102, probe 114, synthetic transaction management system 122 and server system 134 can include or utilize at least one processing unit or other logic device such as programmable logic array engine, or module configured to communicate with one another or other resources or databases. The components of the client device 102, probe 114, synthetic transaction management system 122 and server system 134 can be separate components or a single component. The system 100 and its components, such as the probe 114 and synthetic transaction management system 122, can include hardware elements, such as one or more processors, logic devices, or circuits.

Still referring to FIG. 1, and in further detail, the system 100 can include a client device 102. The client device 102 can include or execute a client application 104. The client device 102 can include or execute a synthetic transaction generator 106. The client device 102 can include or access a client data repository 108. The client data repository 108 can include information that facilitates performing synthetic transactions such as a test 112 and key information 110.

The client application 104 can refer to or include any program configured to access a digital service 136 provided by a server system 134. The client application 104 can include, for example, a web browser that can communicate using a network protocol with a server system 134 that provides a digital server 136. The client application 104 can include a mobile application, desktop application or other type of application that can access a digital service 136 provided by the server system.

The client device 102 can be located or deployed at any location in the network environment depicted in FIG. 1. The client device 102 can be deployed at a location where a typical user using a client device 102 would access the digital service 136. The client device 102 can be deployed at, for example, a branch office, regional office, or campus. The client device 102 can be deployed at a separate site, such as an availability zone managed by a public cloud provider (e.g., cloud 310 depicted in FIG. 3B). If the client device 102 is deployed in a cloud 310, the client device 102 can include or be referred to as a virtual client device or virtual machine. In the event the client device 102 is deployed in a cloud 310, the packets exchanged between the client device 102 and the server system 134 can be received by the cloud infrastructure 316 and then forwarded to the probe 114. In some cases, the probe 114 and synthetic transaction generator 106 can be deployed in the cloud 310 on the same computing host in the infrastructure 316 such that the probe 114 can inspect the packets generated by the synthetic transaction generator 106.

The client device 102 can include a synthetic transaction generator 106 designed, constructed and operational to simulate activities performed by a client application 104 accessing the digital service 136. In implementations, the client device 102 can be referred to as the synthetic transaction generator 106. For example, the synthetic transaction generator 106 can be a standalone device or component that includes hardware and software that can emulate the behavior of the client application 104. The synthetic transaction generator 106 can be configured with one more functions or components of client application 104 in order to simulate the activities performed by the client application 104 to access the digital service 136. In some cases, the synthetic transaction generator 106 can communicate with the server 134 to perform activities simulating accessing the digital service 136. In some cases, the synthetic transaction generator 106 can invoke or launch the client application 104. For example, the synthetic transaction generator 106 can launch the client application 104 and control the client application 104 in order to simulate the activity associated with the digital service 136. The synthetic transaction generator 106 can be a standalone application that includes the functionality of the client application 104 in order to conduct a synthetic transaction with the service 136.

The synthetic transaction generator 106 can access a test 112 stored in the client data repository 108 comprising instructions for executing a test to simulate activity in connection with the digital service 136. The test 112 (or test data) can refer to or include a data structure or data files corresponding to the test. The test 112 can include, for example, a script or instructions regarding types of tests to perform, when to perform the test, and what transactions or activities to simulate for the test. The test data 112 can indicate to perform the test based on a time interval or an event. For example, the time interval can indicate to perform the test at certain times of the day on certain days of the week or month. The time interval can indicate, for example, to perform a test every hour (or every 5 minutes, 10 minutes, 20 minutes, 30 minutes, 2 hours or other time interval) during the weekend (e.g., Saturdays and Sundays). In some cases, the test data 112 can indicate to perform a test of the service 136 responsive to an event, such as when the client device 102 enter a certain state (e.g., boots up, or enters an inactive or standby state). In some cases, the synthetic transaction generator 106 can execute the test responsive to a request. The request can be from the synthetic transaction management system 122, or a user or operator of the synthetic transaction management system 122. The request can be from a remote device, such as the synthetic transaction management system 122. For example, the synthetic transaction management system 122 can determine to conduct a test of the service 136 based on a schedule, trigger, event, or user instruction. Responsive to determining to conduct a test of the service, the synthetic transaction generator 122 can transmit an instruction to the synthetic transaction generator 106 to initiate execution of the test of the performance or availability of the service 136.

Figure 3A:
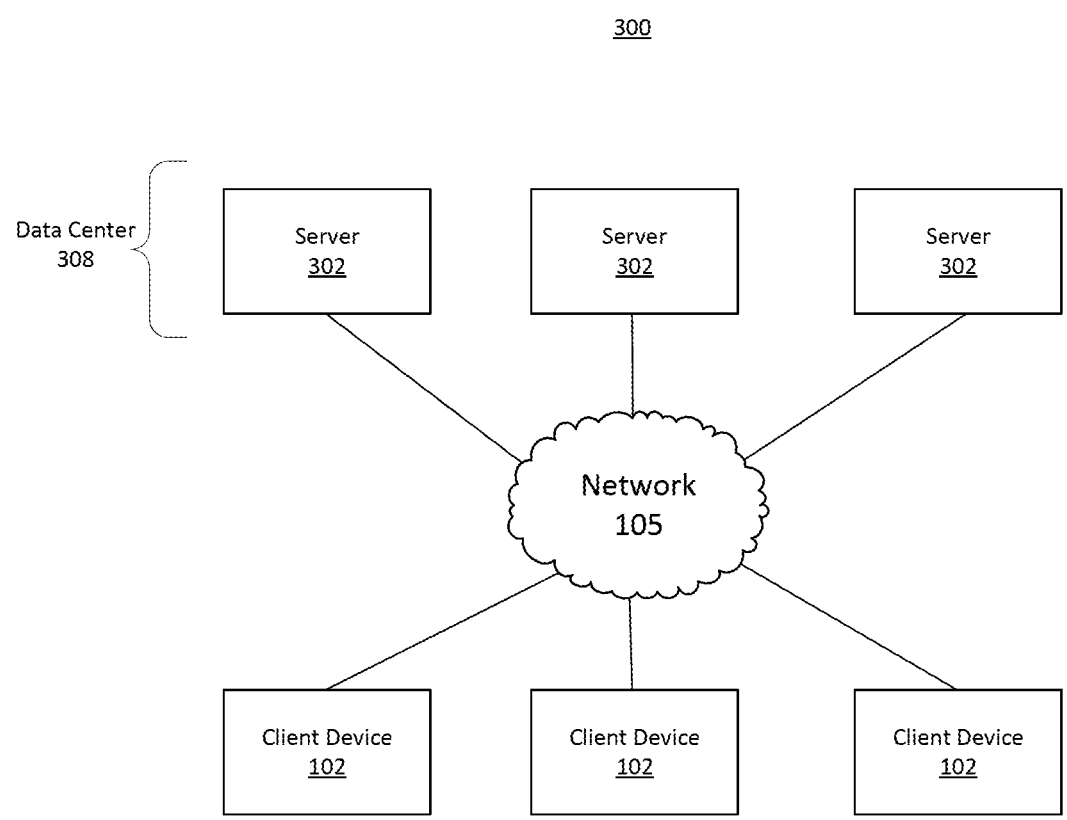
FIG. 3A is a block diagram depicting an implementation of a network environment including a client device in communication with a server device.
Figure 3B:
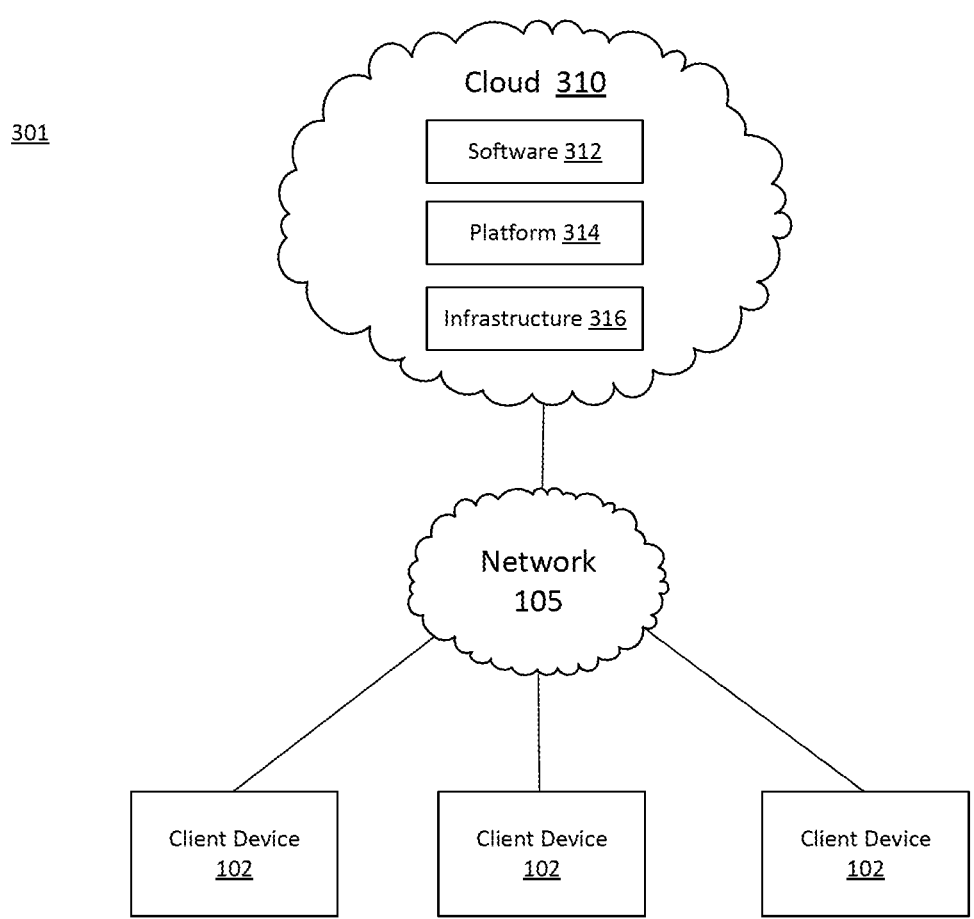
FIG. 3B is a block diagram depicting a cloud computing environment including a client device in communication with cloud service providers.
Figure 3C:
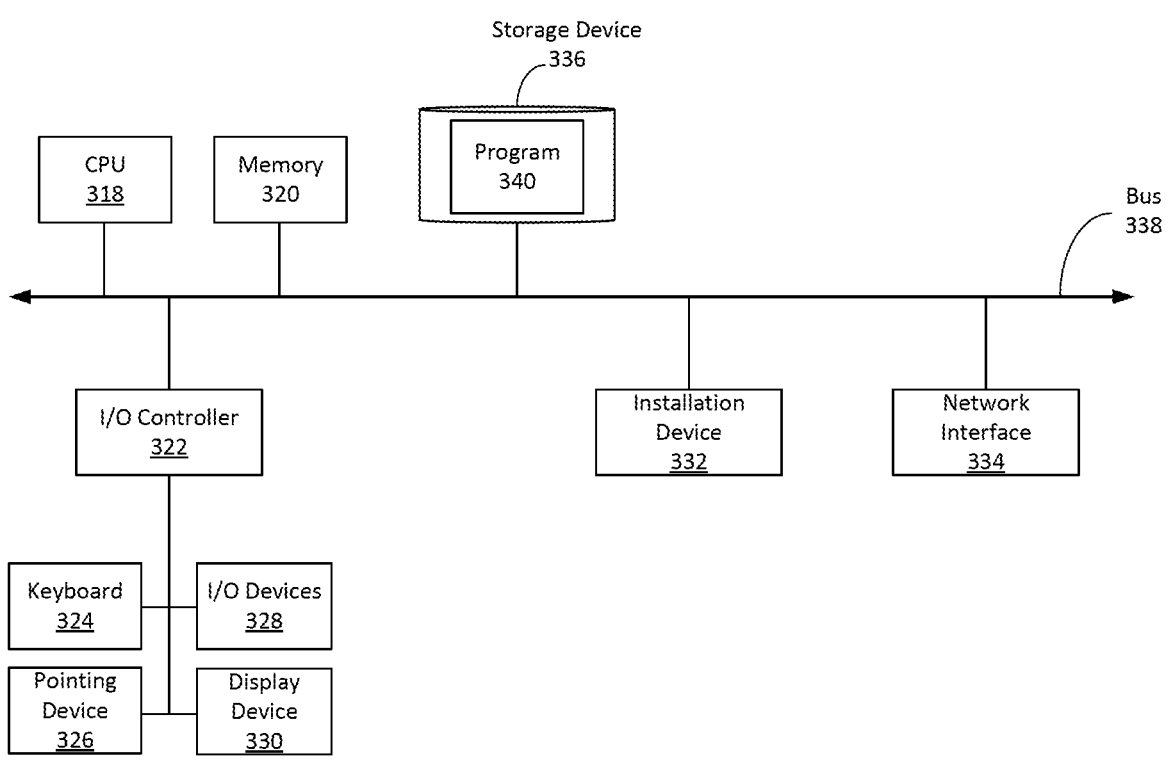
FIG. 3C is a block diagram depicting an implementation of a computing device that can be used in connection with the systems depicted in FIGS. 1, 3A and 3B, the operational flow depicted in FIG. 2B, and the methods depicted in FIGS. 2A, 2C and 2D.

The synthetic transaction management system 122 can include one or more component or functionality of computing system 303 depicted in FIG. 3C. The synthetic transaction management system 122 can include or provide an interface designed, constructed and operational to communicate with the synthetic transaction generator 106 to configure, establish, manage, maintain, or perform a synthetic transaction. The synthetic transaction management system 122 can communicate with the synthetic transaction generator 106 via a network 105, or a direct communication (e.g., wired or wireless connection) with the synthetic transaction generator 106 or client device 102. The synthetic transaction management system 122 can include programs, scripts, schedules, policies or other data or instructions that facilitate performing a synthetic transaction. The synthetic transaction management system 122 can provide such data or instructions to the synthetic transaction generator 106 to configure or establish the synthetic transaction generator 106 in order to execute synthetic transactions. The instructions can include, for example, information about steps or routines in the test, an address of the server system 134 or service 136, information about the probe 114 (e.g., IP address of the probe 114), or other information. The synthetic transaction generator 106 can store or maintain this data or instructions in a test 122 data structure or repository in client data repository 108.

The synthetic transaction generator 106 can initiate execution of a test of the digital service 136 in order to facilitate determining the availability or performance of the digital service 136. To do so, the synthetic transaction generator 106 can access test data 112 to select a type of test to perform. The types of tests can be predetermined and stored in the test data 112 in client data repository 108 or accessed from a different data store via network 105 or accessed via a peripheral device connected to the client device 102. The user or operator of the synthetic transaction management system 122 or client device 102 can select the type of test to perform from a set of tests stored in test data 112.

Upon selecting a type of test to perform, the synthetic transaction generator 106 can initiate execution of the test. The synthetic transaction generator 106 can convey information about the test to the probe 114 using beacon packets. The synthetic transaction generator 106 can generate different types of beacon packets that indicate different information, such as a start beacon packet, key beacon packet, or stop beacon packet (or end beacon packet). The start beacon packet can indicate the beginning of a test, and the stop (or end) beacon packet can indicate the end of the test. The key beacon packet can include key material used to decrypt encrypted data packets.

The synthetic transaction generator 106 can transmit beacon packets using any network protocol. For example, the synthetic transaction generator 106 can transmit beacon packets using transmission control protocol ("TCP") on the same destination port as the test traffic (e.g., TCP port 443), so they follow the same path as the test traffic.

Beacon packets can be configured such that they reach the probe 114, but do not reach the end server system 134 or digital service 136, or are discarded or ignored by the end server system 134 or digital service 136 in the even the beacon packet reaches the server system 134 or digital service. Beacon packets can be configured with a destination IP address different from the server system 134 or service 136 such that the beacon packets arrive at the probe 114 but not the server system 134 or service 136. In implementations, the transaction generator 106 can use a different communication port for the beacon packets such that the beacon packets do not interfere with the session with the digital service 136. In implementations, the synthetic transaction generator 106 can set a time-to-live ("TTL") field in the IP portion of the start beacon packet header so that the start beacon packets are discarded by the network 105 before they reach the actual digital service 136 being tested. The TTL can be set such that the start beacon packet reaches the probe 114 but does not reach the digital service 136 provided by the server 134. The synthetic transaction generator 106 can determine the TTL value to set using a network diagnostic tool such as traceroute in order to track the network pathway taken by a packet on the network 105. The traceroute tool can record the time taken for each hope the packet makes during its route to the destination. The synthetic transaction generator 106 can determine, based on traceroute diagnostics run on a test packet or other packet, the TTL value to use for the start beacon packet. The synthetic transaction generator 106 can set the TTL value for the start beacon packet based on the results of the traceroute diagnostics tool.

However, even if the beacon packets reach the end server system 134 because the TTL was not set or the value of the TTL was too long, the server system 134 or digital service 136 can reject them. For example, the server system 134 or digital service 136 may reject the beacon packets as being malformed or of an unknown type, causing the digital service 136 to ignore the beacon packet. In some cases, the beacon packets can be sent using a non-standard TCP destination port, or a different IP protocol, such as user datagram protocol ("UDP") or Internet Control Message Protocol ("ICMP"). Beacon packets can be sent using a different client port number from the test traffic to ensure that if beacon frames that are sent during the test reach the digital service 136, the beacon frames will not interfere with the session carrying the test traffic because they are sent using a different client port number. When the service being tested uses plaintext HTTP, the beacon frames can use a dummy Universal Resource Locator ("URL") value. The dummy URL value can refer to or include a placeholder URL, test URL, example URL, or predetermined URL value. The dummy URL can have a template or format that matches, corresponds with, or is otherwise consistent with a real URL.

The synthetic transaction generator 106 can begin the test by generating beacon packet such as a start beacon packet. The start beacon packet can include information about the source internet protocol ("IP") address of the client device 102. The start beacon packet can include an indication of the type of test or other identifier associated with the test. The start beacon packet can include the source IP address in a header of the start beacon packet. The start beacon packet can include the test identifier in the header of the start beacon packet, or in the payload of the start beacon packet. The test identifier can include numeric values, alphanumeric values, symbols, or other characters that can indicate the type of test or otherwise identify the test.

The start beacon packet can include a destination IP address. The destination IP address can correspond to the server system 134, digital service 136, probe 114, or packet analyzer system. For example, the destination IP address can be the probe 114. The destination IP address of the probe 114 can be pre-programmed in the test data 112. The synthetic transaction generator 106 can access the destination IP address of the probe 114, and then populate the destination IP address field in the header for the start beacon packet with the retrieved destination IP address for the probe 114.

The client device 102 and server system 134 (or service 136) can establish a secure communication channel or secure communication session. For example, the client device 102 and the server system 134 can communicate using HTTPS requests and responses. HTTPS responses and requests can refer to HTTP responses and requests that are encrypted, such an encryption based on the TLS protocol or QUIC protocol.

To encrypt data packets using the TLS protocol, QUIC protocol, or HTTPS, the client device 102 (e.g., synthetic transaction generator 106 or client application 104) and server system 134 (or digital service 136) can perform a handshake (e.g., TLS handshake or QUIC handshake). During the initial handshake phase of a TLS session, for example, the client device 102 and server system 134 can use a key agreement algorithm to derive a set of key material that is known to both the client device 102 and the server system 134, and that is unique to that TLS session. The key agreement mechanisms can be configured such that if an eavesdropper only has access to the TLS handshake packets, the eavesdropper cannot determine the key material. For example, the TLS handshake can include the client device 102 and the server system 134 specifying which version of TLS to use for the secure communication session, deciding on which cipher suit to use, authenticating the identity of the server system 134 via a public key of the server system 134 and a digital signature of the secure socket layer ("SSL") certificate authority that issued the public key to the server system 134, and generating session keys in order to use symmetric encryption after the handshake is complete. In implementations, the client device 102 can perform a QUIC handshake to establish a key pursuant to the QUIC protocol.

The server system 134 can use various types of key agreements. For example, the server system 134 can use a Rivest-Shamir-Adleman ("RSA") key agreement or static Diffie-Hellman ("DH") key agreement. RSA and DH key agreements can use a static secret key that is installed on the server system 134. The server system 134 can use a key agreement that does not use static keys. For example, the server system 134 can use an Ephemeral Diffie-Hellman ("DHE") key agreement. In DHE key agreement, no static secret keys can be shared with the probe in advance. Thus, when a synthetic test is made to a service 136 operated by a third-party, then any static keys (if used) may not be available to the probe 114 or synthetic transaction management system 122.

Upon completing the handshake process, the synthetic transaction generator 106 can perform synthetic transactions by exchanging encrypted data packets with the digital service 136 provided by the server system 134. For example, if the digital service 136 is a collaboration service web site, then the synthetic transaction generator 106 can perform one or more of the following tests: 1) log into the web site homepage; 2) join a meeting; 3) wait in the meeting; 4) leave the meeting; and 5) log out. The system can detect a problem with one or more of these tests. Each of these five tests can include one or more synthetic transactions, which can include the exchange of data packets between the client device 102 and the digital service 136. Thus, to perform a test, the synthetic transaction generator 106 can generate data packets corresponding to HTTPS requests and transmit the data packets to the digital service 136. The digital service can generate HTTPS responses to the requests and transmit the responses to the client device 102.

After the synthetic transaction generator 106 establishes the key to use for the session, the synthetic transaction generator 106 can provide material or information corresponding to the key to the probe 114. The synthetic transaction generator 106 can provide the key material to the probe 114 using a key beacon packet. The synthetic transaction generator 106 can provide the key material once the key material has been established and prior to the handshake process being completed. The synthetic transaction generator 106 can provide the key material after the handshake process has been completed. The synthetic transaction generator 106 can provide the key material to the probe 114 after the handshake process has been complete, and prior to exchanging the encrypted data packets corresponding to synthetic transaction for the test. The synthetic transaction generator 106 can provide the key material in a separate key beacon packet prior to the end of the test. The synthetic transaction generator 106 can provide the key material to the probe 114 at the end of the test in a stop beacon packet. The key beacon packet and start beacon packet can include information identifying the client device 102, such as the source IP address. The key beacon packet or stop beacon packet can include information identifying the test, such as the type of test identifier or other identifier.

In an illustrative example, the synthetic transaction generator 106 can begin the test by deleting a log file storing key information on the client device 102. The log file can be stored in key info 110 in data repository 108. The key info 110 can refer to an SSLKEYLOG file. The synthetic transaction generator 106 can delete, reset, erase, or otherwise clear the key information stored in the key info 110 log file in data repository 108 upon initiation of the test. After clearing the key info 110, the synthetic transaction generator 106 can transmit a start beacon packet that includes the test type identifier. The synthetic transaction generator 106 can use a client application 104 (e.g., a script, tool, or web browser) to execute the test, which can result in multiple HTTPS transactions.

The client application 104 can generate individual or sequences of HTTP requests to the server system 134. The client application 104 can provide browser functionality to complete a transaction, for example executing JavaScript code. The client application can include or refer to a tool such as a "headless" version of a web browser.

The client application 104 can provide SSLKEYLOG feature. To use this feature, an operating system environment variable called SSLKEYLOG specifies the path and name of a file (e.g., key info 110). Once this variable is set, every time the client application 104 establishes a new TLS connection, the client application 104 can write the key material for the session into the key info 110 file specified in the environment variable. Digital services 136 such as web pages can include links to other objects, such as images, which could be hosted on the same web server or an entirely different web site. For example, the digital service 136 can access a back-end service 142 hosted by a back-end server system 140. In another example, the client application 104 can directly access a different server system 140 to obtain certain data. As a result, a single HTTPS request can cause the client application 104 to initiate multiple HTTPS requests either directly or via the service 136. Therefore, the key info 110 (e.g., SSLKEYLOG file) can include entries for multiple TLS sessions. The multiple entries can be transmitted to the probe 114 using one or more beacon packets (e.g., one or more key beacon packets or stop beacon packets).

The synthetic transaction generator 106 can transmit the contents of the key info 110 (e.g., the SSLKEYLOG file) in a key beacon packet at any point after the key info 110 has been stored and prior to completion of the test, or along with a stop beacon packet at the end of the test. The synthetic transaction generator 106 can transmit the contents of the key info 110 to the probe 114 after each secure session so that the probe 114 has the ability to decrypt the data packets in real-time. To provide the key material subsequent to the handshake process and prior to completion of the test, the client application 104 can be configured with functionality to allow the beacon frames with key material to be sent between the handshake and subsequent secure application packets (e.g., TLS application packets or QUIC application packets). The synthetic transaction generator 106 can instruct the client application 104 to transmit the key material subsequent to the handshake process. In some cases, the synthetic transaction generator 106 can transmit the contents of the key info 110 to the probe 114 upon completion of the test so that the probe 114 can decrypt the packets after the completion of the test.

The system 100 can include a probe 114 designed, constructed and operational to receive packets associated with the test executed by the synthetic transaction generator 106. The probe 114 can refer to or in include a passive monitoring probe. The probe 114 can be deployed at any location in the network environment such that the probe 114 can receive data packets associated with the test. For example, the probe 114 can be deployed at the location of the client device 102, on a same network as the client device 102, at a location on the network 105 in-between the client device 102 and the server system 134, or at the server system 134. The probe 114 can be deployed on a same local network as the client device 102 or the server system 134. The probe 114 can deployed at a network gateway or router deployed at a location of the client device 102 or server system 134. The probe 114 can be deployed in the cloud 310, such as in infrastructure 316 (e.g., if the synthetic transaction generator 106 is deployed in the cloud 310, the probe 114 can also be deployed in cloud 310 in order to intercept the data packets). Thus, the probe 114 can be deployed anywhere in the network environment such that the probe 114 can obtain data packets exchanged during a test between the client device 102 and the server system 134. The probe 114 can be coupled to interfaces and links in the network 105 to passively monitor and collect signaling data from one or more interfaces in the network 105.

The probe 114 can be positioned in-line with all or a portion of network traffic flowing through network 105. The probe 114 can include a packet interceptor 138 designed, constructed and operational to intercept packets. In some cases, the packet interceptor 138 can refer to separate packet interceptor 138 devices that can be distributed about the network 105 to intercept packets flowing at various locations of the network 105, including disposed at locations along communication links coupled to the network 105 or disposed at or integrated with client device 102 coupled to the network 105.

The packet interceptor 138 can intercept or make copies of packets of the network traffic. The packet interceptor 138 can be passive or active and include software, firmware, and/or hardware components, such as taps, probes, or port mirrors that can be positioned in-line along communication links between client devices 102 and server system 134, or integrated with client device 102. The packet interceptor 138 can be deployed between the synthetic transaction generator 106 and the interconnection with the network 105 (e.g., public Internet or wide area network ("WAN")).

In the case of a physical site, the packet interceptor 138 can receive a copy of packets flowing to the network 105 (e.g., the Internet or WAN) from a tap in-line with the an edge router located at the physical site, or from a switch port analyzer ("SPAN") port on the edge router. The packet interceptor 138 can include software modules, which can include software agents, or can be virtual devices that are remote relative to devices 102 and the communication links.

The probe 114 can include a packet monitor 116 designed, configured and operational to receive packets exchanged between the client device 102 and server system 134 during a test. The packets intercepted by the packet interceptor 138 can be collected by the packet monitor 116. The packet monitor 116 can provide the packets, or create packet summaries and provide the packet summaries, to a probe data repository 118 or synthetic transaction management system 122. Providing the packets or packet summaries can include storing the data such that it can be accessed or transmitting the data.

The packet monitor 116 can receive packets intercepted by the packet interceptor 138. The packet monitor 116 can receive a copy of packets intercepted by the packet interceptor 138. The packet monitor 116 can parse, analyze, or other process one or more packets. The packet monitor 116 can perform one or more functions or activities to facilitate evaluating the availability or performance of a service 136 by processing packets associated with synthetic transactions of a test.

The probe 114 (or packet monitor 116) can receive, from the client device 102 (e.g., a synthetic transaction generator 106), a start beacon packet that identifies a test of a service 136 provided by one or more servers of a server system 134. The packet monitor 116 can determine that the sequence of packets is a synthetic test based on the start beacon packet. The start beacon packet can include information identifying the type of test that the packets represent. The packet monitor 116 can be configured to determine that the data packets received between the start beacon packet and a stop (or end) beacon packet that contain the same source IP address as the start beacon packet belong to the same test.

Upon receiving the start beacon packet, the packet monitor 116 can establish a log 120 file for the test in the probe data repository 118. The packet monitor 116 can establish a log for the test responsive to receipt of the start beacon packet. Receipt of the start beacon packet indicating the beginning of the test can cause the packet monitor 116 can establish a log file in the probe data repository 118.

The packet monitor 116 can establish a log 120 with a unique identifier. The log 120 file can include information associated with the test, such as the test type identifier, the source IP address of the client device 102 conducting the test, the type of digital service 136, a time and date stamp for the test, or other information associated with the test. The packet monitor 116 can create a unique identifier for the test and assign the unique identifier to the log 120 file stored in probe data repository 118. The packet monitor 116 can generate the unique identifier using any technique. For example, the packet monitor 116 can generate the unique identifier based on one or more of the source IP address, test type identifier, or timestamp. Thus, the packet monitor 116 can establish the log 120 for the test with the source IP address, the test type identifier, and a unique identifier. The packet monitor 116 can mark (e.g., flag, tag, or otherwise assign an identifier) the start beacon packet with the test type identifier and the unique identifier. The packet monitor 116 can store the start beacon packet marked with the test type identifier and the unique identifier in the log 120 file.

The packet monitor 116 can store data packets transmitted between the client device 102 and the digital service 136 subsequent to the start beacon packet. The data packets can be encrypted with the key established by the client device 102 and the server system 134 during the TLS handshake process. The packet monitor 116 can store the data packets received between the start and stop beacon packets in the log 120 file established for the test responsive to receipt of the start beacon packet.

The packet monitor 116 can store information about the sequence of data packets in the log 120 file. The packet monitor 116 can store time stamps or a sequence ID associated with the data packets exchanged between the client device 102 and server system 134 during the test. In the event that different tests are conducted, the packet monitor 116 can create a new log 120 file for each test so as to maintain data packets associated with different tests separately.

For example, the start beacon packet can include a source IP address. The packet monitor 116 can parse a header of a first data packet sent after the start beacon packet to identify a first source IP address of the first data packet. The packet monitor 116 can compare the first source IP address of the first data packet with the source IP address included in the start beacon packet to determine that the first source IP address of the first data packet matches the source IP address indicated in the start beacon packet. Responsive to determining that the first source IP address matches the source IP address of the start beacon packet, the packet monitor 116 can store the first data packet in the log 120 established for the test.

Upon completion of the test, the synthetic transaction generator 106 can transmit a stop beacon packet. The packet monitor 116 can receive the stop beacon packet from the client device 102 indicating completion of the test. The stop beacon packet can include information identifying the test, such as the source IP address of the client device 102, or the test type identifier. The packet monitor 116 can store the stop beacon packet in the log 120 file for the test.

The packet monitor 116 can release then log 120 file to complete the test. Releasing the log 120 file can refer to or include closing the file such that additional data is not written to the log 120 file. Releasing the log 120 file can refer to or include changing permissions or access rights to the file from read/write to read-only. Releasing the log 120 file can refer to include an indication in the log 120 file that the test is complete. Releasing the log 120 file can refer to or include transmitting the log 120 file to another system for further processing. Thus, the packet monitor 116 can release, responsive to the stop beacon packet, the log 120 file to prevent data packets received subsequent to the stop beacon packet from being stored in the log 120 file established for the test.

The probe 114 can receive key information or key material from the client device 102. The probe 114 can receive key information that can be used to decrypt the data packets of the test that were encrypted with the key using the TLS protocol. The probe 114 can receive the key material in a key beacon packet, or the probe 114 can receive a stop beacon packet that contains the key material. The probe 114 can store the key material in the log 120 for the test. The probe 114 can store the stop beacon containing the key material in the log 120 for the test. The probe 114 can store the key material to allow a future process to decrypt the data packets.

In some cases, the probe 114 can receive the key material in a key beacon packet at the beginning of the test. For example, the probe 114 can receive the key material once the key has been established during the handshake process (e.g., TLS handshake, QUIC handshake, or other security protocol handshake), and prior to the subsequent data packets of the synthetic transaction of the test being exchanged between the client device 102 and the server system 134. For example, the packet monitor 116 can receive a key beacon packet subsequent to a TLS or QUIC handshake process between the client device 102 and the server system 134, or once the TLS or QUIC handshake process establishes a key for the TLS or QUIC session. The key beacon packet can include key information or key material used to decrypt data packets exchanged during the session. The key information can include any information used to decrypt the data packets of the session. The key information can include a static key, a dynamic key, or a unique key established for the session. If the key beacon packet is received prior to and separate from the stop beacon packet, the packet monitor 116 can receive the data packets of the test subsequent to receipt of the key beacon. Thus, the packet monitor 116 can receive, subsequent to receipt of the data packets of the synthetic transaction of the test, the stop beacon packet from the client device 102 indicating completion of the test.

The probe 114 can decrypt the data packets after the test is complete, or decrypt the data packets in real-time and store the decrypted data packets in the log 120. The probe 114 can store the encrypted data packets in the log 120, or the probe 114 can store the decrypted data packets in the log 120. In the event the probe 114 receives the key material before the synthetic transaction is executed, the probe 114 can determine to decrypt the encrypted data packets of the test in real-time. In some cases, the probe 114 can determine not to decrypt the data packets in real-time so as to reduce processor and memory utilization of the probe 114 computing device. By determining not to decrypt the data packets in real-time, the probe 114 can avoid introducing latency or delay into the activities performed by system 100 over network 105.

In some cases, the probe 114 can receive the key material in the stop beacon packet at the end of the test. For example, the probe 114 can receive, from the client device 102, a stop beacon packet including a first source IP address and the key information. The packet monitor 116 can determine that the test is complete based on the first source IP address in the stop beacon packet matching the source IP address in the start beacon packet stored in the log 120 file. The packet monitor 116 can store the stop beacon packet in the log 120 file along with the key information. In some cases, the probe 114 can determine to decrypt the previously stored data packets in the log 120 upon receipt of the key material in the stop beacon, and revise the log 120 to include the decrypted contents of the data packets.

The probe 114 can analyze, process, or otherwise evaluate the data packets of the test in order to determine the availability or performance of the digital service 136 being tested. The probe 114 can include a decryptor 124 designed, configured and operational to decrypt the data packets of the test that were encrypted using the security protocol (e.g., HTTPS or STMP electronic messages encrypted using TLS). The probe 114 can access the log 120 from at the completion of the test, or during the test. The decryptor 124 can obtain the key information received from the client device 102 (either in a key beacon packet or the stop beacon packet) and decrypt the data packets of the test.

For example, a user or operator of the probe 114 can select the sequence of packets matching the test of interest. The probe 114 can retrieve the log file for the test from the probe data repository 118. If the data packets are encrypted, the decryptor 124 can search for or identify the key material stored in the log file and extract the key material. For example, if the decryptor 124 determines that the first packet in the sequence is a start beacon, the decryptor 124 can step through the packets sequentially until the decryptor 124 finds the key beacon packet or the stop beacon packet containing key material. The decryptor 124 can proceed to decrypt the contents of the encrypted packets using the key material. If there are multiple keys stored in the log arising from multiple secure sessions in the test, the decryptor 124 can use the random nonce sequence in the handshake to identify the corresponding key material for the set of data packets being processed.

In the event the probe 114 receives a key beacon packet containing the key material after each handshake between the client device 102 and the server system 134, the probe 114 can use the key material in the beacon packets to decrypt application packets as they were received. In this case, the probe 114 can proceed with analyzing the packets to generate metrics without having to decrypt the packets because the probe 114 decrypted the data packets in real-time and stored the contents of the data packets in a decrypted manner.

The probe 114 can include a metric generator 126 designed, constructed and operational to generate a metric or otherwise provide an indicator of the availability or performance of the digital service 136 being tested. The metric generator 126 can generate metrics upon completion of the test, in real-time during the test, or responsive to a request for performance information during the test or after completion of the test. The metric generator 126 can access the data packets decrypted by the decryptor 124 or probe 114, and analyze the data packets. The metric generator 126 can identify a test status code in the packets that can indicate whether the test was a success. The metric generator 126 can determine a duration of the test, and generate a metric based on the duration of the test. The metric generator 126 can parse data in the data packets, such as data in the HTTP request and response data packets. The data can include codes indicating a status or state of the HTTP request or response.

The metric generator 126 can generate baseline metrics for the test. The baseline metrics can include, for example, a response time for each type of test. The metric generator 126 can determine the response time as a time delay between the first packet from the client device 102 to the last packet from the server system 134. The metric generator 126 can evaluate an error code or status code for a specific HTTP response stored in a data packet. The metric generator 126 can identify the error code or status code from the decrypted data packet. The metric generator 126 can generate a metric based on the number of error codes or types of error codes. For example, the metric can indicate that the test failed based on an error code indicating an error. The metric can indicate that the test passed based on the lack of an error code in the data packets. The metric generator 126 can evaluate URLs of the links in an HTTP page.

The probe 114 can provide information regarding the performance of the test. The probe 114 can compare the metric with a baseline metric stored in threshold data structure 132. The threshold 132 data structure can include baseline metric generated by the probe 114 based on historical tests, or can include predetermined thresholds established by an operator of the probe 114. The probe 114 can compare the metric generated for the test with a performance threshold stored in the threshold data structure 132, and generate an alert based on the comparison. The probe 114 can transmit the alert or a notification to an operator device, such as the client device 102, via a push notification, electronic message, text message, or other electronic communication.

In some cases, the probe 114 or other system (e.g., synthetic transaction management system 122) can be configured to adjust a configuration of the digital service 136 or server system 134 based on the performance information or comparison between the metric and the threshold performance. The probe 114 can (e.g., automatically or responsive to the comparison) adjust or modify a configuration of the digital service 136 (e.g., application) executed by the one or more servers to improve performance of the digital service 136. For example, the probe 114 can restart a server of the server system 134 that hosts the digital service 136, allocate additional memory or storage to the service 136, allocate a faster processor to the service 136, allocate additional network bandwidth to the service 136, or download a patch or software update to the service 136.

Figure 2A:
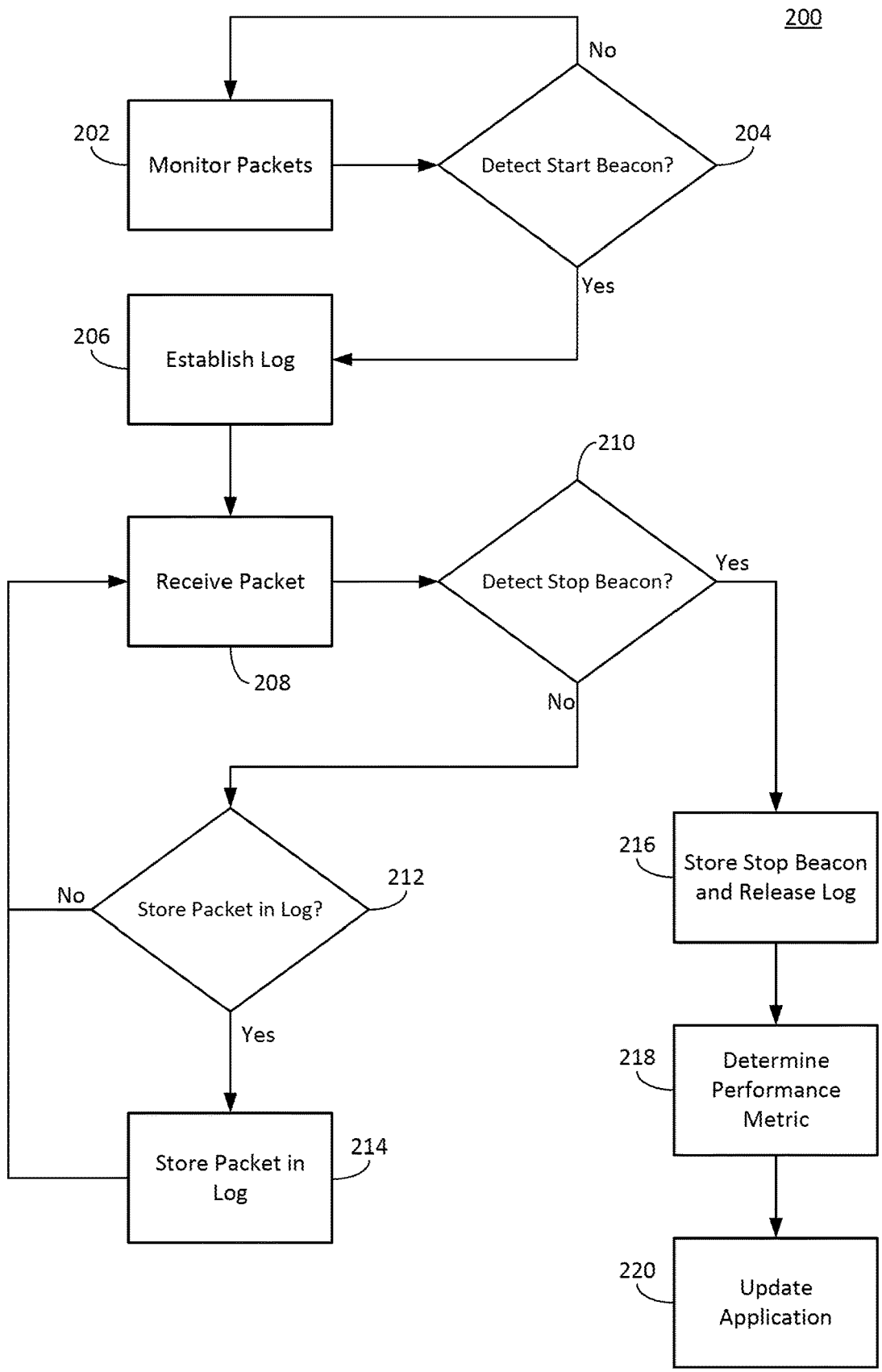
FIG. 2A is an illustration of a method of decrypting synthetic transactions, in accordance with an implementation.

FIG. 2A is an illustration of a method of decrypting synthetic transaction with beacon packets, in accordance with an implementation. The method 200 can be performed by one or more system, component or module depicted in FIG. 1, 3A, 3B, or 3C, including, for example, a client device, probe, synthetic transaction management system, and server system. At ACT 202, a probe can monitor for packets received from a client device (e.g., synthetic transaction generator). The probe can continuously monitor for packets. Upon receiving a packet, the probe can proceed to decision block 204 to determine whether a start beacon was detected. The probe can parse or process the data packet received at ACT 202 to determine whether the data packets corresponds to a start beacon. If the data packet does not correspond to a start beacon of a test of a digital service, the probe can return to ACT 202 and continue to monitor packets. If, however, at decision block 204 the probe determines that the received packet is a start beacon, the probe can continue to ACT 206 to establish a log.

At ACT 206, the probe can parse the start beacon to identify information in the start beacon. For example, the probe can identify a source IP address and test type identifier. The probe can establish a log file for the test. The probe can assign a filename or other identifier to the log file based on the source IP address, test type identifier, or a unique identifier. The start beacon can indicate the beginning of a test of an application provided by a server by conducting synthetic transactions.

At ACT 208, the probe can receive a data packet. The probe can receive the data packet subsequent to the start beacon. At decision block 210, the probe can parse the received data packet to determine whether the data packet is a stop beacon. If the received data packet is not a stop beacon, the probe can continue to decision block 212 to determine whether to store the packet in the log established for the test. To determine whether to store the data packet in the log for the test, the probe can compare a source IP address of the received data packet with the source IP address of the start beacon. If the IP addresses of the start beacon and received data packet do not match, then the probe can determine not to store the data packet in the log for the test, and then return to ACT 208 to receive additional packets.

If, however, at decision block 212 the probe determines that the source IP address of the received data packet matches the source IP address of the start beacon, the probe can proceed to ACT 214 to store the packet in the log established for the test. The data packet can be encrypted, in which case the probe can store the encrypted data packet in the log. In the event the probe received key material for the secure session corresponding to the test, the probe can decrypt the data packet in real-time and store the decrypted data packet in the log.

Upon storing the data packet in the log file established for the test, the probe can return to ACT 208 to receive additional data packets. The probe can receive one or more additional data packets, or receive a stop beacon. At decision block 210, if the probe determines that a stop beacon has been received, the probe can proceed to ACT 216 to store the stop beacon packet and release the log file. The probe can verify that the stop beacon corresponds to the same test by comparing the source IP address of the stop beacon with the source IP address of the start beacon that established the log file. The stop beacon can include key material used to decrypt data packets of the test, in which case the key material can be stored in the log file along with the stop beacon. The stop beacon can include a status code indicating the performance of the test of the service.

The probe can provide the log file to a packet analyzer system for analysis, or the probe can perform an analysis. At ACT 218, the probe or packet analyzer system can determine performance metrics for the test. For example, the packet analyzer system can retrieve the log file containing the encrypted packets. The packet analyzer system can identify the start beacon packet in the log file and then step through the log file to identify the key material, which can be contained in a key beacon or the stop beacon. Upon identifying the key material, the probe can decrypt the data packets of the test in order to parse the contents of the data packets and determine how well the test performed.

At ACT 220, the digital service or application being tested can be updated, modified, or adjusted. For example, if the performance of the application was poor or sub-optimal, the application can be updated (e.g., update the software version, change a configuration of the application, or update the computing resource allocated for execution of the application).

Figure 2B:
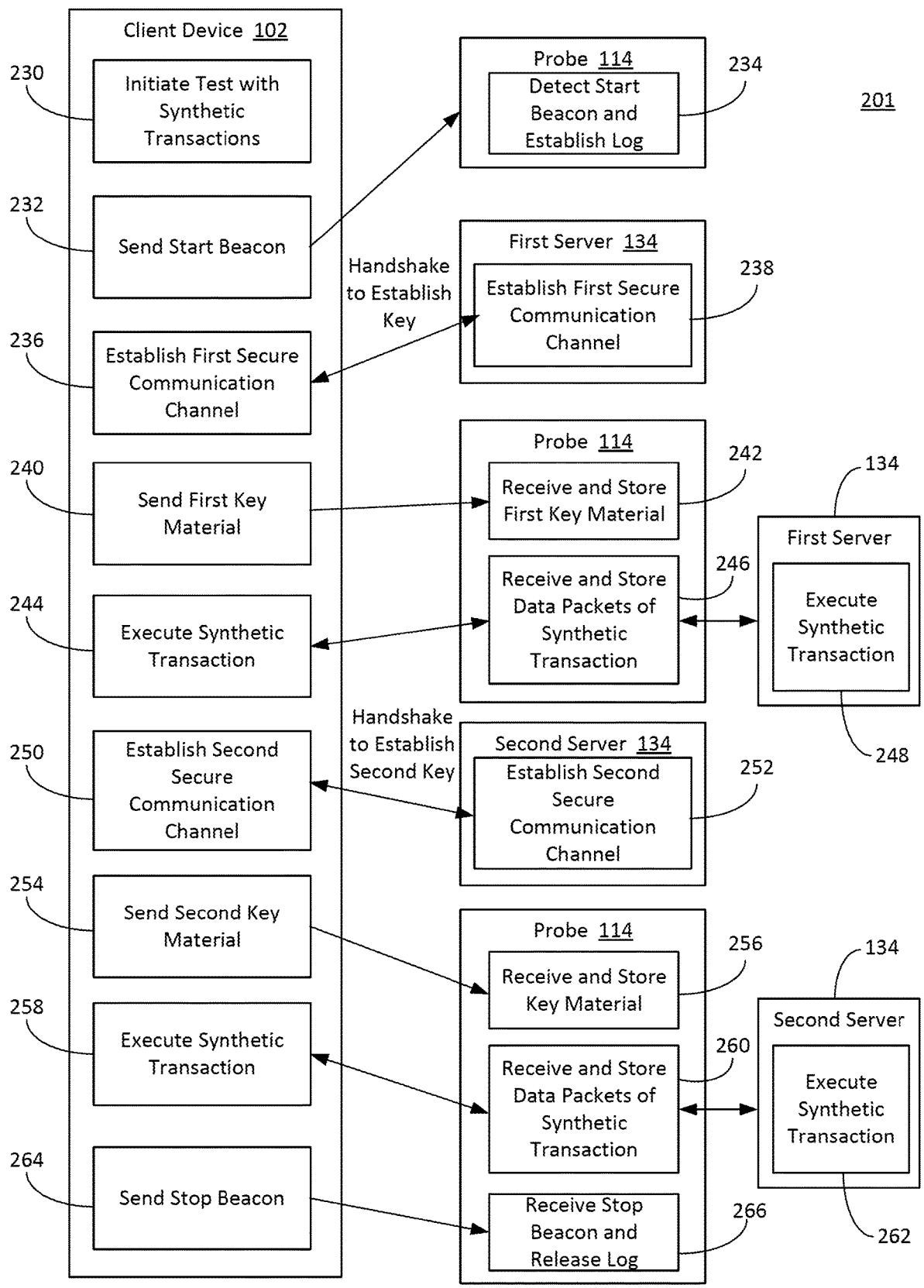
FIG. 2B is an illustration of an operational flow of a system to decrypt synthetic transactions, in accordance with an implementation.

FIG. 2B is an illustration of an operational flow of a system to decrypt synthetic transactions, in accordance with an implementation. The flow 201 can be performed by one or more system, component or module depicted in FIG. 1, 3A, 3B, or 3C, including, for example, a client device 102, probe 114, and server system 134. At 230, the client device 102 can initiate a test using synthetic transactions. The client device 102 can include a script, program, or tool to initiate the synthetic transaction. The client device 102 can initiate the test responsive to a request or instruction from a user, or responsive to a trigger based on a time interval.

At ACT 232, the client device 102 can send a start beacon packet to the probe 114. At ACT 234, the probe 114 can detect the start beacon and establish a log file for the test. The probe 114 can mark the start beacon with the source IP address provided in the start beacon and test type identifier, and then store the marked start beacon packet in the log established responsive to receipt of the start beacon packet.

At ACT 236, the client device can initiate establishing a first secure communication channel (or session) with the first server 134. The first server 134 can host, execute, or provide the digital service being tested. At ACT 238 the first server can establish the secure session with the client device 102 using a handshaking process, such as a TLS handshake. During the TLS handshake, the client device 102 and first server 134 can establish first key material for the session that can be used to decrypt the contents of the encrypted data packets exchanged during the session.

At ACT 240, the client device 102 can send the first key material to the probe 114. The client device 102 can transmit the first key material in a separate key beacon packet. At ACT 242, the probe 114 can receive and store the first key material. In implementations, the probe 114 can store the key material by writing the beacon frame containing the key material to the log. The key beacon packet may not reach the first server 134 because of the TTL set for the key beacon packet, which allows the key beacon packet to reach the probe 114. In the event the key beacon packet inadvertently reaches the first server 134, the first server 134 can disregard or ignore the key beacon packet. Beacon packets can be sent using a different client port number from the test traffic to ensure that if beacon frames that are sent during the test reach the digital service, the beacon frames will not interfere with the session carrying the test traffic because they are sent using a different client port number.

At ACT 244, the client device can execute the synthetic transaction corresponding to the test. The probe 114, at ACT 246, can intercept data packets associated with the synthetic transactions and store the data packets in the log. The probe 114 can store all data packets received between the start beacon packet and stop beacon packet that contain the same source IP address as the start beacon packet. The probe 114 can forward or relay the data packets to the first server 134 as the probe 114 can be in-line with the first server 134. The probe 114 can also receive data packets from the first server 134, correlate the data packets with the same test, and store the data packets in the log. At ACT 248, the first server 134 can execute the synthetic transaction and generate and transmit data packets back to the client device 102.

At ACT 250, the client device 102 can establish a second secure communication channel. The client device 102 can establish, for example, a second secure communication channel to access contents from a second server 134, and the second server 134 can establish the secure communication channel with the client device 102 at ACT 252. For example, the digital service being tested can include a web page providing content sourced from multiple different servers (e.g., a first server 134 and a second server 134). For the client device 102 to access and retrieve the different content from the different servers, the client device 102 can establish secure communication channels with each of the respective servers. Thus, at ACT 250, the client device 102 and second server 134 can undergo a TLS handshake to establish second key material.

At ACT 254, the client device 102 can send the second key material to the probe 114. The client device 102 can provide an indicator that the second key material corresponds to data packets exchanged with the second server. At ACT 256, the probe 114 can receive the second key material and store the key material in the log for the test. At ACT 258, the client device 102 can proceed to execute the part of the synthetic transaction with the second server 134, which the second server executes at ACT 262 (e.g., delivering the requested content or executing a server-side script). The probe 114, at ACT 260, can store the data packets corresponding to the synthetic transaction in connection with the second server 134.

At ACT 264, the client device 102 can transmit a stop beacon. The stop beacon can include the same source IP address as the start beacon transmitted at ACT 232. The probe 114 can receive the stop beacon at ACT 266, and then release the log file.

Figure 2C:
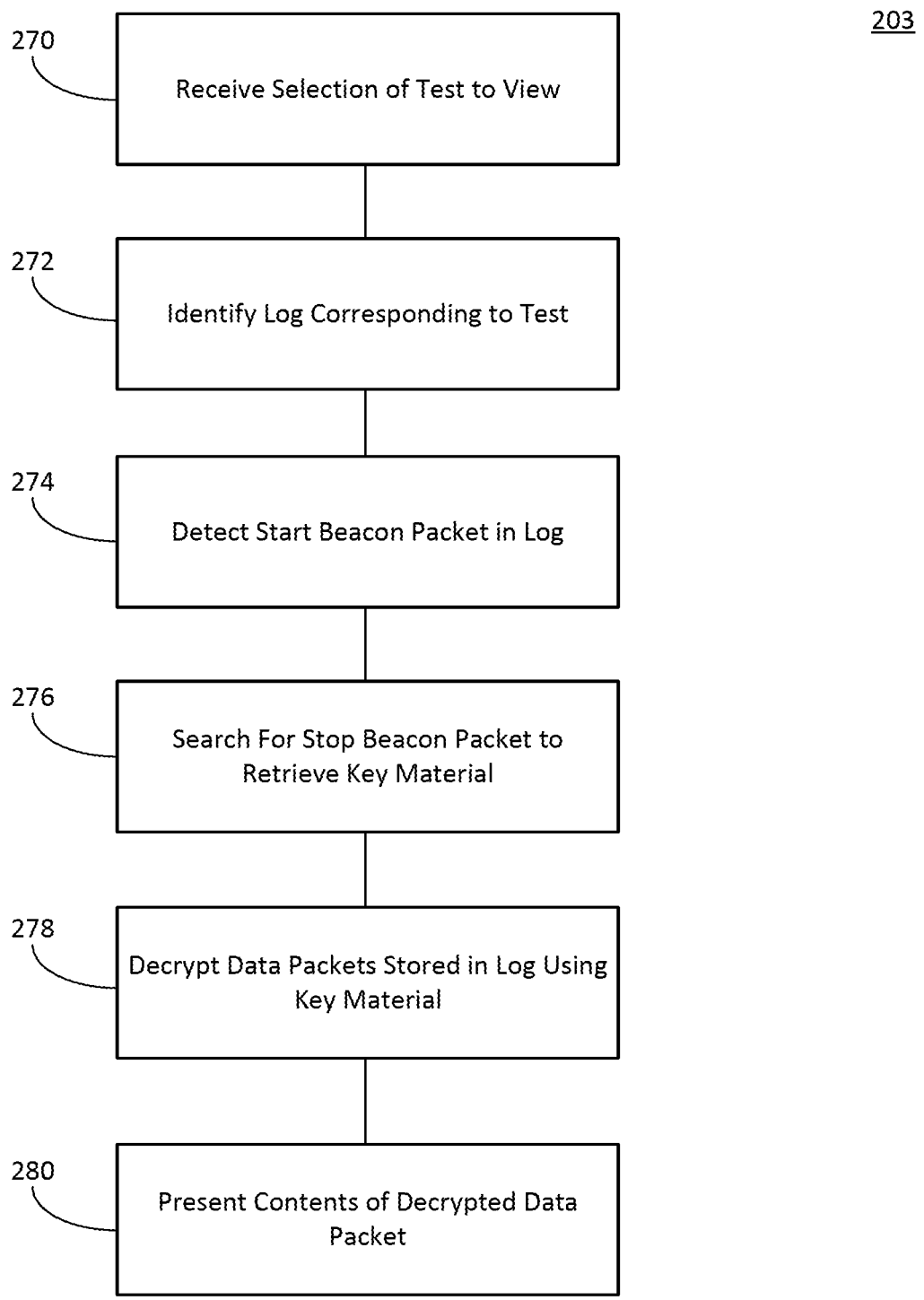
FIG. 2C is an illustration of a method of decrypting synthetic transactions, in accordance with an implementation.

FIG. 2C is an illustration of a method of decrypting synthetic transaction with beacon packets, in accordance with an implementation. The method 203 can be performed by one or more system, component or module depicted in FIG. 1, 3A, 3B, or 3C, including, for example, a client device, probe, synthetic transaction management system, and server system. At ACT 270, the probe (or other packet analyzer system) can receive a selection of a test to view. The probe can store, in a data repository, packet data corresponding to one or more simulated tests of applications of digital services. The probe can provide a graphical user interface, which can be displayed via a computing device. The probe can receive, from an input interface, selection of a test to view.

In some cases, the probe can provide information about the test to facilitate selection of a test to view. For example, the probe can provide an indication of the status of the test, or a day/time stamp associated with the test, or a type of test. The probe can filter tests based on one or more of these factors.

At ACT 272, the probe can identify a log file corresponding to the selected test. The probe can, for example, perform a lookup in a data repository to retrieve or access the selected log.

At ACT 274, the probe can detect a start beacon packet in the log. The probe can further detect or determine whether the contents of the data packets stored in the log are encrypted. If the probe determines that the contents of the log are encrypted, the probe, at ACT 276, can search for key material stored in the log. For example, the probe can search for a key beacon packet stored in the log, or for a stop beacon packet stored in the log that contains the key material.

At ACT 278, the probe can decode the data packets stored in the log using the retrieved key material. At ACT 280, the probe can present the decrypted contents of the decrypted or decoded data packets. The probe can present the contents for view via display device connected to the probe.

Figure 2D:
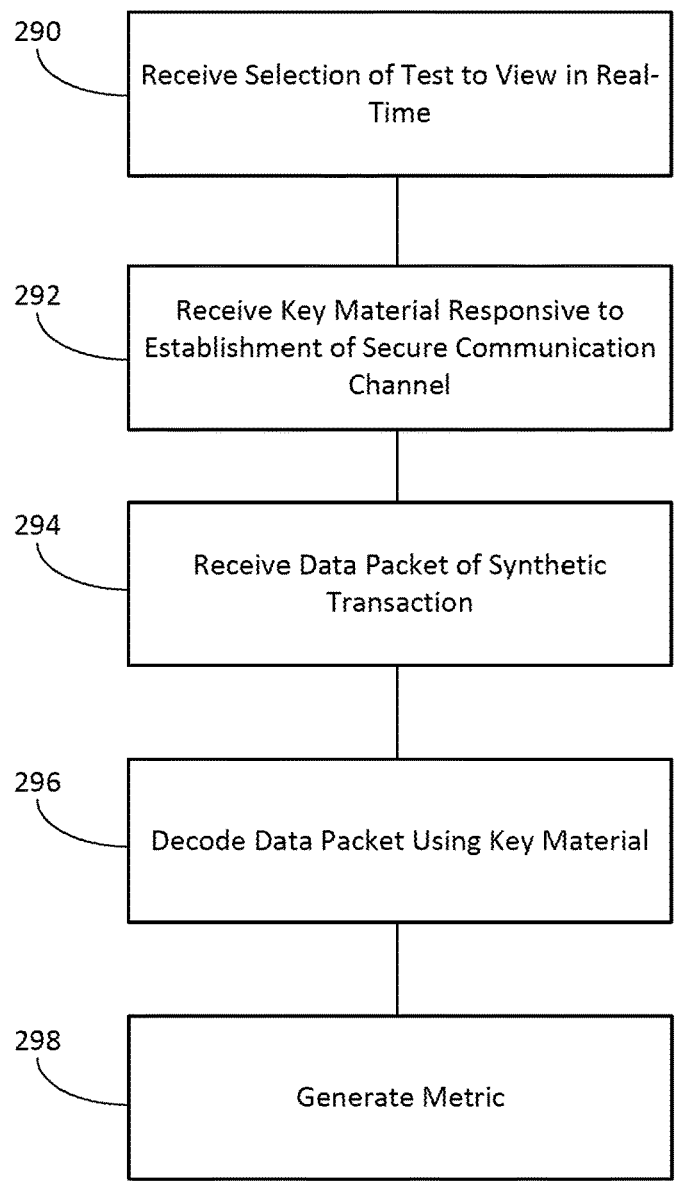
FIG. 2D is an illustration of a method of decrypting synthetic transactions, in accordance with an implementation.

FIG. 2D is an illustration of a method of decrypting synthetic transaction with beacon packets, in accordance with an implementation. The method 205 can be performed by one or more system, component or module depicted in FIG. 1, 3A, 3B, or 3C, including, for example, a client device, probe, synthetic transaction management system, packet analyzer system, and server system. At ACT 290, the probe (or other packet analyzer system) can receive a selection of a test to view in real-time. Viewing a test in real-time can refer to viewing contents of data packets prior to receipt of the stop beacon. The test can be on-going, long-lived test, and the probe can receive data packets for synthetic transactions of the test while also presenting metrics or information about the test to a user or operator.

For example, at ACT 292, the probe can receive key material responsive to establishment of a secure communication channel (e.g., HTTPS or SMTP using TLS) in a key beacon packet. The probe can receive the key material prior to receipt of a stop beacon packet or completion of the test. At ACT 294, the probe can receive data packets subsequent to the key beacon packet that correspond to the synthetic transaction of the test of the service. The probe, at ACT 296, can decode or decrypt the data packets of the synthetic transaction in real-time because the probe previously received the key material. At ACT 298, the probe can generate a metric associated with the test. The probe can also provide the contents of the decoded data packet in real-time, or prior to completion of the test. The probe can generate performance metrics in real-time. In implementations, the probe can generate performance metrics in real-time, but without decrypting or presenting the contents of the data packets. For example, the probe can generate a performance metric based on a response time, ping time or other transmission time associated with a data packet of the test without decrypting the contents of the data packets or without presenting the contents of the data packet.

FIG. 3A depicts an example network environment that can be used in connection with the methods and systems described herein. In brief overview, the network environment 300 includes one or more clients devices 102 (also generally referred to as clients, client node, client machines, client computers, client computing devices, endpoints, or endpoint nodes) in communication with one or more servers 302 (also generally referred to as servers, nodes, or remote machine) via one or more networks 304. In some embodiments, a client 102 has the capacity to function as both a client node seeking access to resources provided by a server and as a server providing access to hosted resources for other clients 102.

Although FIG. 3A shows a network 304 between the clients 102 and the servers 302, the clients 102 and the servers 302 can be on the same network 304. In embodiments, there are multiple networks 304 between the clients 102 and the servers 302. The network 304 can include multiple networks such as a private network and a public network. The network 304 can include multiple private networks.

The network 304 can be connected via wired or wireless links. Wired links can include Digital Subscriber Line (DSL), coaxial cable lines, or optical fiber lines. The wireless links can include BLUETOOTH, Wi-Fi, Worldwide Interoperability for Microwave Access (WiMAX), an infrared channel or satellite band. The wireless links can also include any cellular network standards used to communicate among mobile devices, including standards that qualify as 1G, 2G, 3G, 4G, 5G or other standards. The network standards can qualify as one or more generation of mobile telecommunication standards by fulfilling a specification or standards such as the specifications maintained by International Telecommunication Union. Examples of cellular network standards include AMPS, GSM, GPRS, UMTS, LTE, LTE Advanced, Mobile WiMAX, and WiMAX-Advanced. Cellular network standards can use various channel access methods e.g. FDMA, TDMA, CDMA, or SDMA. In some embodiments, different types of data can be transmitted via different links and standards. In other embodiments, the same types of data can be transmitted via different links and standards.

The network 304 can be any type and/or form of network. The geographical scope of the network 304 can vary widely and the network 304 can be a body area network (BAN), a personal area network (PAN), a local-area network (LAN), e.g. Intranet, a metropolitan area network (MAN), a wide area network (WAN), or the Internet. The topology of the network 304 can be of any form and can include, e.g., any of the following: point-to-point, bus, star, ring, mesh, or tree. The network 304 can be an overlay network which is virtual and sits on top of one or more layers of other networks 304. The network 304 can be of any such network topology as known to those ordinarily skilled in the art capable of supporting the operations described herein. The network 304 can utilize different techniques and layers or stacks of protocols, including, e.g., the Ethernet protocol or the internet protocol suite (TCP/IP). The TCP/IP internet protocol suite can include application layer, transport layer, internet layer (including, e.g., IPv6), or the link layer. The network 304 can be a type of a broadcast network, a telecommunications network, a data communication network, or a computer network.

The network environment 300 can include multiple, logically grouped servers 302. The logical group of servers can be referred to as a data center 308 (or server farm or machine farm). In embodiments, the servers 302 can be geographically dispersed. The data center 308 can be administered as a single entity or different entities. The data center 308 can include multiple data centers 38 that can be geographically dispersed. The servers 302 within each data center 308 can be homogeneous or heterogeneous (e.g., one or more of the servers 302 or machines 302 can operate according to one type of operating system platform (e.g., WINDOWS NT, manufactured by Microsoft Corp. of Redmond, Wash.), while one or more of the other servers 302 can operate on according to another type of operating system platform (e.g., Unix, Linux, or Mac OS X)). The servers 302 of each data center 308 do not need to be physically proximate to another server 302 in the same machine farm 38. Thus, the group of servers 302 logically grouped as a data center 308 can be interconnected using a network. Management of the data center 308 can be de-centralized. For example, one or more servers 302 can comprise components, subsystems and modules to support one or more management services for the data center 308.

Server 302 can be a file server, application server, web server, proxy server, appliance, network appliance, gateway, gateway server, virtualization server, deployment server, SSL VPN server, or firewall. In embodiments, the server 302 can be referred to as a remote machine or a node. Multiple nodes can be in the path between any two communicating servers.

FIG. 3B illustrates an example cloud computing environment. A cloud computing environment 301 can provide client 102 with one or more resources provided by a network environment. The cloud computing environment 301 can include one or more clients 102, in communication with the cloud 310 over one or more networks 304. Clients 102 can include, e.g., thick clients, thin clients, and zero clients. A thick client can provide at least some functionality even when disconnected from the cloud 310 or servers 302. A thin client or a zero client can depend on the connection to the cloud 310 or server 302 to provide functionality. A zero client can depend on the cloud 310 or other networks 304 or servers 302 to retrieve operating system data for the client device. The cloud 310 can include back end platforms, e.g., servers 302, storage, server farms or data centers.

The cloud 310 can be public, private, or hybrid. Public clouds can include public servers 302 that are maintained by third parties to the clients 102 or the owners of the clients. The servers 302 can be located off-site in remote geographical locations as disclosed above or otherwise. Public clouds can be connected to the servers 302 over a public network. Private clouds can include private servers 302 that are physically maintained by clients 102 or owners of clients. Private clouds can be connected to the servers 302 over a private network 304. Hybrid clouds 308 can include both the private and public networks 304 and servers 302.

The cloud 310 can also include a cloud-based delivery, e.g. Software as a Service (SaaS) 312, Platform as a Service (PaaS) 314, and Infrastructure as a Service (IaaS) 316. IaaS can refer to a user renting the use of infrastructure resources that are needed during a specified time period. IaaS providers can offer storage, networking, servers or virtualization resources from large pools, allowing the users to quickly scale up by accessing more resources as needed. PaaS providers can offer functionality provided by IaaS, including, e.g., storage, networking, servers or virtualization, as well as additional resources such as, e.g., the operating system, middleware, or runtime resources. SaaS providers can offer the resources that PaaS provides, including storage, networking, servers, virtualization, operating system, middleware, or runtime resources. In some embodiments, SaaS providers can offer additional resources including, e.g., data and application resources.

Clients 102 can access IaaS resources, SaaS resources, or PaaS resources. In embodiments, access to IaaS, PaaS, or SaaS resources can be authenticated. For example, a server or authentication server can authenticate a user via security certificates, HTTPS, or API keys. API keys can include various encryption standards such as, e.g., Advanced Encryption Standard (AES). Data resources can be sent over Transport Layer Security (TLS) or Secure Sockets Layer (SSL).

The client 102 and server 302 can be deployed as and/or executed on any type and form of computing device, e.g. a computer, network device or appliance capable of communicating on any type and form of network and performing the operations described herein.

FIG. 3C depicts block diagrams of a computing device 303 useful for practicing an embodiment of the client 102 or a server 302. As shown in FIG. 3C, each computing device 303 can include a central processing unit 318, and a main memory unit 320. As shown in FIG. 3C, a computing device 300 can include one or more of a storage device 336, an installation device 332, a network interface 334, an I/O controller 322, a display device 330, a keyboard 324 or a pointing device 326, e.g. a mouse. The storage device 336 can include, without limitation, a program 340, such as an operating system, software, or software associated with system 100.

The central processing unit 318 is any logic circuitry that responds to and processes instructions fetched from the main memory unit 320. The central processing unit 318 can be provided by a microprocessor unit, e.g.: those manufactured by Intel Corporation of Mountain View, Calif. The computing device 303 can be based on any of these processors, or any other processor capable of operating as described herein. The central processing unit 318 can utilize instruction level parallelism, thread level parallelism, different levels of cache, and multi-core processors. A multi-core processor can include two or more processing units on a single computing component.

Main memory unit 320 can include one or more memory chips capable of storing data and allowing any storage location to be directly accessed by the microprocessor 318. Main memory unit 322 can be volatile and faster than storage 336 memory. Main memory units 3222 can be Dynamic random access memory (DRAM) or any variants, including static random access memory (SRAM). The memory 320 or the storage 336 can be non-volatile; e.g., non-volatile read access memory (NVRAM). The memory 320 can be based on any type of memory chip, or any other available memory chips. In the example depicted in FIG. 3C, the processor 318 can communicate with memory 320 via a system bus 338.

A wide variety of I/O devices 328 can be present in the computing device 303. Input devices 328 can include keyboards, mice, trackpads, trackballs, touchpads, touch mice, multi-touch touchpads and touch mice, microphones, multi-array microphones, drawing tablets, cameras, or other sensors. Output devices can include video displays, graphical displays, speakers, headphones, or printers.

I/O devices 328 can have both input and output capabilities, including, e.g., haptic feedback devices, touchscreen displays, or multi-touch displays. Touchscreen, multi-touch displays, touchpads, touch mice, or other touch sensing devices can use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices can allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, can have larger surfaces, such as on a table-top or on a wall, and can also interact with other electronic devices. Some I/O devices 328, display devices 330 or group of devices can be augmented reality devices. The I/O devices can be controlled by an I/O controller 322 as shown in FIG. 3C. The I/O controller 322 can control one or more I/O devices, such as, e.g., a keyboard 324 and a pointing device 326, e.g., a mouse or optical pen. Furthermore, an I/O device can also provide storage and/or an installation device 332 for the computing device 303. In embodiments, the computing device 303 can provide USB connections (not shown) to receive handheld USB storage devices. In embodiments, an I/O device 328 can be a bridge between the system bus 338 and an external communication bus, e.g. a USB bus, a SCSI bus, a FireWire bus, an Ethernet bus, a Gigabit Ethernet bus, a Fibre Channel bus, or a Thunderbolt bus.

In embodiments, display devices 330 can be connected to I/O controller 322. Display devices can include, e.g., liquid crystal displays (LCD), electronic papers (e-ink) displays, flexile displays, light emitting diode displays (LED), or other types of displays. In some embodiments, display devices 330 or the corresponding I/O controllers 322 can be controlled through or have hardware support for OPENGL or DIRECTX API or other graphics libraries. Any of the I/O devices 328 and/or the I/O controller 322 can include any type and/or form of suitable hardware, software, or combination of hardware and software to support, enable or provide for the connection and use of one or more display devices 330 by the computing device 303. For example, the computing device 303 can include any type and/or form of video adapter, video card, driver, and/or library to interface, communicate, connect or otherwise use the display devices 330. In embodiments, a video adapter can include multiple connectors to interface to multiple display devices 330.

The computing device 303 can include a storage device 336 (e.g., one or more hard disk drives or redundant arrays of independent disks) for storing an operating system or other related software, and for storing application software programs 340 such as any program related to the systems, methods, components, modules, elements, or functions depicted in FIG. 1, 2A, 2B, 2C or 2D. Examples of storage device 336 include, e.g., hard disk drive (HDD); optical drive including CD drive, DVD drive, or BLU-RAY drive; solid-state drive (SSD); USB flash drive; or any other device suitable for storing data. Storage devices 336 can include multiple volatile and non-volatile memories, including, e.g., solid state hybrid drives that combine hard disks with solid state cache. Storage devices 336 can be non-volatile, mutable, or read-only. Storage devices 336 can be internal and connect to the computing device 303 via a bus 338. Storage device 336 can be external and connect to the computing device 303 via a I/O device 330 that provides an external bus. Storage device 336 can connect to the computing device 303 via the network interface 334 over a network 304. Some client devices 102 may not require a non-volatile storage device 336 and can be thin clients or zero clients 102. Some storage devices 336 can be used as an installation device 316 and can be suitable for installing software and programs.

The computing device 303 can include a network interface 334 to interface to the network 304 through a variety of connections including, but not limited to, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). The computing device 303 can communicate with other computing devices 303 via any type and/or form of gateway or tunneling protocol e.g. Secure Socket Layer (SSL) or Transport Layer Security (TLS), QUIC protocol, or the Citrix Gateway Protocol manufactured by Citrix Systems, Inc. of Ft. Lauderdale, Fla. The network interface 334 can include a built-in network adapter, network interface card, PCMCIA network card, EXPRESSCARD network card, card bus network adapter, wireless network adapter, USB network adapter, modem or any other device suitable for interfacing the computing device 303 to any type of network capable of communication and performing the operations described herein.

A computing device 303 of the sort depicted in FIG. 3C can operate under the control of an operating system, which controls scheduling of tasks and access to system resources. The computing device 303 can be running any operating system configured for any type of computing device, including, for example, a desktop operating system, a mobile device operating system, a tablet operating system, or a smartphone operating system.

The computer system 303 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computer system 300 has sufficient processor power and memory capacity to perform the operations described herein. In some embodiments, the computing device 300 can have different processors, operating systems, and input devices consistent with the device.

In embodiments, the status of one or more machines 102, 302 in the network 304 can be monitored as part of network management. In embodiments, the status of a machine can include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information can be identified by a plurality of metrics, and the plurality of metrics can be applied at least in part towards decisions in load distribution, network traffic management, and network failure recovery as well as any aspects of operations of the present solution described herein.

The processes, systems and methods described herein can be implemented by the computing device 303 in response to the CPU 318 executing an arrangement of instructions contained in main memory 320. Such instructions can be read into main memory 320 from another computer-readable medium, such as the storage device 336. Execution of the arrangement of instructions contained in main memory 320 causes the computing system 303 to perform the illustrative processes described herein. One or more processors in a multi-processing arrangement may also be employed to execute the instructions contained in main memory 320. Hard-wired circuitry can be used in place of or in combination with software instructions together with the systems and methods described herein. Systems and methods described herein are not limited to any specific combination of hardware circuitry and software.

Although an example computing system has been described in FIG. 3, the subject matter including the operations described in this specification can be implemented in other types of digital electronic circuitry, or in computer software, firmware, or hardware, including the structures disclosed in this specification and their structural equivalents, or in combinations of one or more of them.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). The operations described in this specification can be implemented as operations performed by a data processing apparatus on data stored on one or more computer-readable storage devices or received from other sources.

The terms "computing device" or "component" encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of the probe 114 or synthetic transaction management system 122) to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks. The processor and the memory can be supplemented by, or incorporated in, special purpose logic circuitry.

While operations are depicted in the drawings in a particular order, such operations are not required to be performed in the particular order shown or in sequential order, and all illustrated operations are not required to be performed. Actions described herein can be performed in a different order. The separation of various system components does not require separation in all implementations, and the described program components can be included in a single hardware or software product.

The phraseology and terminology used herein is for the purpose of description and should not be regarded as limiting. Any references to implementations or elements or acts of the systems and methods herein referred to in the singular may also embrace implementations including a plurality of these elements, and any references in plural to any implementation or element or act herein may also embrace implementations including only a single element. Any implementation disclosed herein may be combined with any other implementation or embodiment.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A method of decrypting synthetic transactions with beacon packets, comprising:
   receiving, by a probe comprising one or more processors, from a client device, a start beacon packet that identifies a test of a service provided by one or more servers;
   establishing, by the probe responsive to receipt of the start beacon packet, a log for the test;
   identifying, by the probe responsive to the start beacon packet, a plurality of data packets corresponding to the test transmitted between the client device and the one or more servers subsequent to the start beacon packet and encrypted, by the client device or the service, with a key using a security protocol;

receiving, by the probe from the client device, key information used to decrypt the plurality of data packets of the test encrypted with the key using the security protocol; and storing, by the probe in the log established for the test, at least one of the plurality of data packets for evaluation or decryption using the key information to determine a performance of the service.

2. The method of claim 1, comprising:

decrypting, by the probe, one or more of the plurality of data packets using the key information;

storing, by the probe subsequent to the decrypting, the one or more of the plurality of data packets in the log; and receiving, by the probe subsequent to the storing, a stop beacon packet from the client device indicating completion of the test.

3. The method of claim 1, comprising:

receiving, by the probe, a stop beacon packet from the client device indicating completion of the test;

releasing, by the probe responsive to the stop beacon packet, the log to prevent data packets received subsequent to the stop beacon packet from being stored in the log established for the test; and decrypting, by the probe subsequent to releasing the log, at least one of the plurality of data packets using the key information.

4. The method of claim 1, wherein the start beacon packet comprises a source internet protocol "IP" address, comprising:

parsing, by the probe, a header of a first data packet of the plurality of data packets to identify a first source IP address of the first data packet;

determining, by the probe, the first source IP address of the first data packet matches the source IP address indicated in the start beacon packet; and storing, by the probe responsive to the first source IP address matching the source IP address, the first data packet in the log.

5. The method of claim 4, comprising:

receiving, by the probe subsequent to receipt of a stop beacon packet and completion of the test, a request to view a packet of the plurality of data packets stored in the log for the test;

identifying, by the probe responsive to the request, the stop beacon packet stored in the log;

retrieving, by the probe, the key information stored in the stop beacon packet;

decrypting, by the probe, a payload of the packet using the key information retrieved from the stop beacon packet stored in the log; and determining, based on the payload of the packet, a metric indicating a performance of the test of the service.

6. The method of claim 1, wherein the start beacon packet comprises a source internet protocol "IP" address, comprising:

receiving, by the probe from the client device, a stop beacon packet including a first source IP address and the key information;

determining, by the probe, that the test is complete based on the first source IP address in the stop beacon packet matching the source IP address; and storing, by the probe, the stop beacon packet in the log along with the key information.

7. The method of claim 1, wherein the security protocol comprises one of a transport layer security ("TLS") protocol or a QUIC protocol, comprising:

receiving, by the probe subsequent to a handshake process between the client device and the one or more servers, a key beacon comprising the key information;

receiving, by the probe, the plurality of data packets of the test subsequent to receipt of the key beacon; and receiving, by the probe subsequent to the plurality of data packets of the test, a stop beacon packet from the client device indicating completion of the test.

8. The method of claim 1, wherein the security protocol comprises a transport layer security ("TLS") protocol, and wherein the key information comprises one of a static key or a dynamic key established during a TLS handshake process executed for the test of the service.

9. The method of claim 1, wherein the key information comprises a plurality of keys corresponding to a plurality of sessions established responsive to a plurality of hypertext transfer protocol secure ("HTTPS") requests initiate by a web browser executing on the client device.

10. The method of claim 1, comprising:

identifying, by the probe, a source internet protocol ("IP") address of the start beacon packet and a test type identifier;

establishing, by the probe, the log for the test with the source IP address, the test type identifier, and a unique identifier;

marking, by the probe, the start beacon packet with the test type identifier and the unique identifier; and storing, by the probe, the start beacon packet marked with the test type identifier and the unique identifier in the log.

11. The method of claim 1, comprising:

receiving, by the probe, the start beacon packet from a synthetic transaction generator executing on the client device, wherein the plurality of data packets comprise synthetic transactions initiated by the synthetic transaction generator.

12. The method of claim 1, comprising:

determining a metric for the test based on the plurality of data packets; and adjusting, based on a comparison of the metric with a performance threshold, a configuration of the service executed by the one or more servers to improve performance of the service.

13. A system to decrypt synthetic transactions with beacon packets, comprising:

a probe component comprising one or more processors to:

receive, from a client device, a start beacon packet that identifies a test of a service provided by one or more servers;

establish, responsive to receipt of the start beacon packet, a log for the test;

identify, responsive to the start beacon packet, a plurality of data packets corresponding to the test transmitted between the client device and the one or more servers subsequent to the start beacon packet and encrypted, by the client device or the service, with a key using a security protocol;

receive, from the client device, key information used to decrypt the plurality of data packets of the test encrypted with the key using the security protocol; and store, in the log established for the test, at least one of the plurality of data packets for evaluation or decryption using the key information to determine a performance of the service.

14. The system of claim 13, comprising the probe component to:
- decrypt one or more of the plurality of data packets using the key information;
- store, subsequent to the decrypting, the one or more of the plurality of data packets in the log; and
- receive, subsequent to the storing, a stop beacon packet from the client device indicating completion of the test.

15. The system of claim 13, comprising the probe component to:
- receive a stop beacon packet from the client device indicating completion of the test;
- release, responsive to the stop beacon packet, the log to prevent data packets received subsequent to the stop beacon packet from being stored in the log established for the test; and
- decrypt, subsequent to releasing the log, at least one of the plurality of data packets using the key information.

16. The system of claim 13, wherein the start beacon packet comprises a source internet protocol "IP" address, comprising the probe component to:
- parse a header of a first data packet of the plurality of data packets to identify a first source IP address of the first data packet;
- determine the first source IP address of the first data packet matches the source IP address indicated in the start beacon packet; and
- store, responsive to the first source IP address matching the source IP address, the first data packet in the log.

17. The system of claim 16, comprising the probe component to:
- receive, subsequent to receipt of a stop beacon packet and completion of the test, a request to view a packet of the plurality of data packets stored in the log for the test;
- identify, responsive to the request, the stop beacon packet stored in the log;
- retrieve the key information stored in the stop beacon packet;
- decrypt a payload of the packet using the key information retrieved from the stop beacon packet stored in the log; and
- determine, based on the payload of the packet, a metric indicating a performance of the test of the service.

18. The system of claim 13, wherein the security protocol comprises one of a transport layer security ("TLS") protocol or a QUIC protocol, comprising the probe component to:
- receive, subsequent to a handshake process between the client device and the one or more servers, a key beacon comprising the key information;
- receive the plurality of data packets of the test subsequent to receipt of the key beacon; and
- receive, subsequent to the plurality of data packets of the test, a stop beacon packet from the client device indicating completion of the test.

19. A non-transitory computer-readable storage medium storing executable instructions that, when executed by one or more processors, cause the one or more processors to decrypt synthetic transactions, the instructions comprising instructions to:
- receive, from a client device, a start beacon packet that identifies a test of a service provided by one or more servers;
- establish, responsive to receipt of the start beacon packet, a log for the test;
- identify, responsive to the start beacon packet, a plurality of data packets corresponding to the test transmitted between the client device and the one or more servers subsequent to the start beacon packet and encrypted, by the client device or the service, with a key using a security protocol;
- receive, from the client device, key information used to decrypt the plurality of data packets of the test encrypted with the key using the security protocol; and
- store, in the log established for the test, at least one of the plurality of data packets for evaluation or decryption using the key information to determine a performance of the service.

20. The non-transitory computer-readable storage medium of claim 19, wherein the start beacon packet comprises a source internet protocol "IP" address, further comprising instructions to:
- parse a header of a first data packet of the plurality of data packets to identify a first source IP address of the first data packet;
- determine the first source IP address of the first data packet matches the source IP address indicated in the start beacon packet; and
- store, responsive to the first source IP address matching the source IP address, the first data packet in the log.

* * * * *